July 10, 1934.   E. G. JURGENS ET AL   1,965,897
CARTON CLOSING MACHINE
Filed April 8, 1932   6 Sheets-Sheet 1

July 10, 1934.  E. G. JURGENS ET AL  1,965,897
CARTON CLOSING MACHINE
Filed April 8, 1932   6 Sheets-Sheet 3

Inventors
Emil G. Jurgens.
Hazen K. Becker.
by Rummler Rummler
& Woodworth Attys.

Witness
Arthur M. Framke.

July 10, 1934.  E. G. JURGENS ET AL  1,965,897
CARTON CLOSING MACHINE
Filed April 8, 1932   6 Sheets-Sheet 4
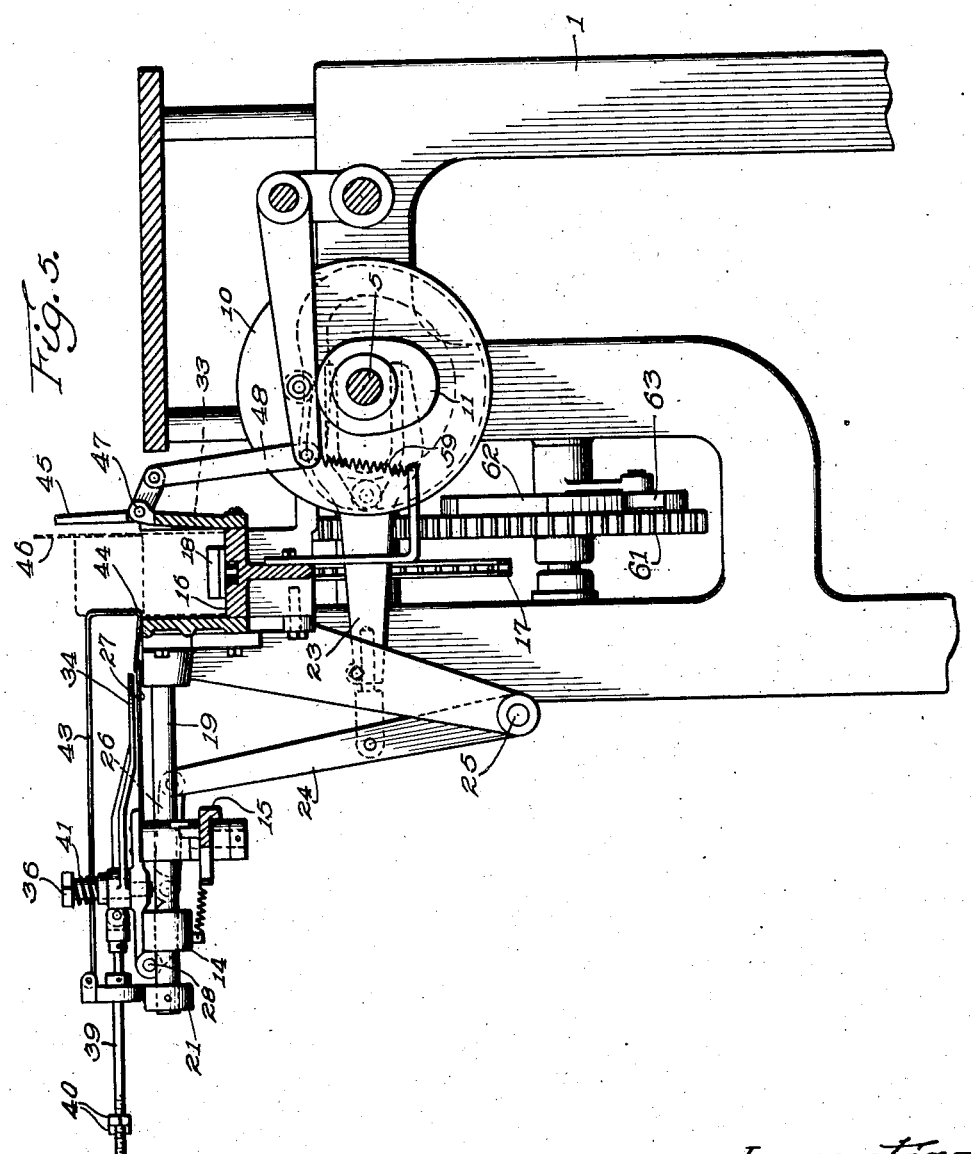
Inventors
Emil G. Jurgens.
Hazen K. Becker.

July 10, 1934.  E. G. JURGENS ET AL  1,965,897
CARTON CLOSING MACHINE
Filed April 8, 1932   6 Sheets-Sheet 5
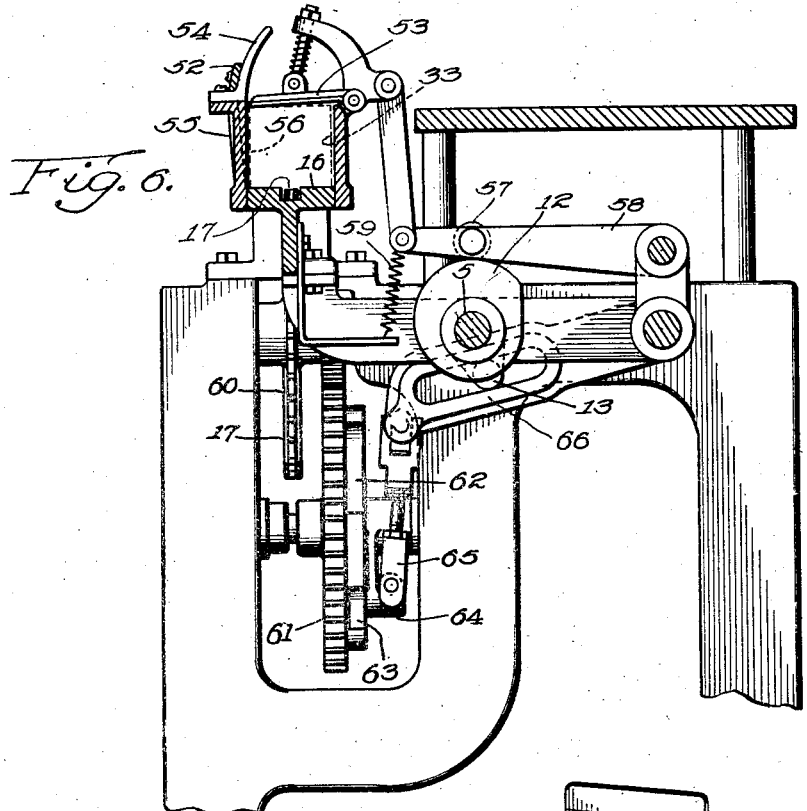
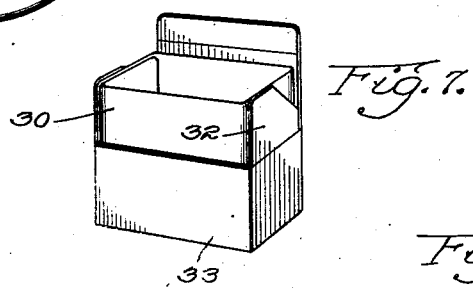
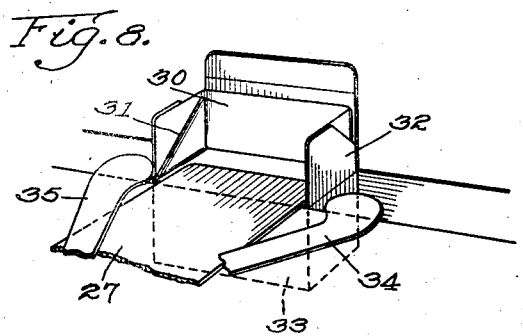
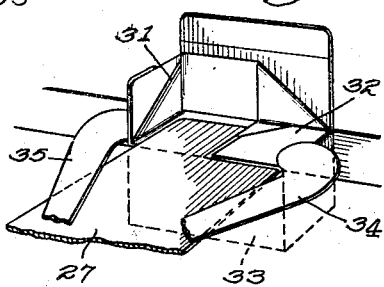
Inventors
Emil G. Jurgens.
Hazen K. Becker.

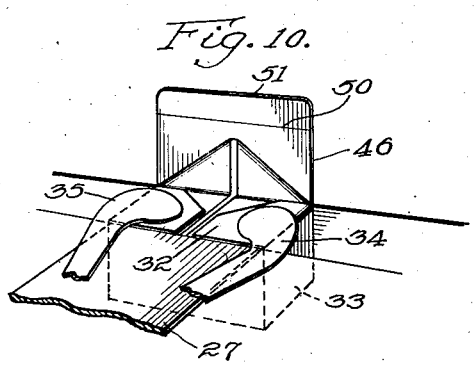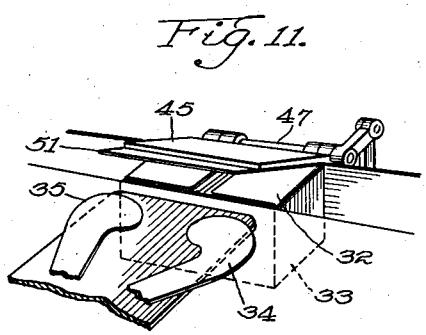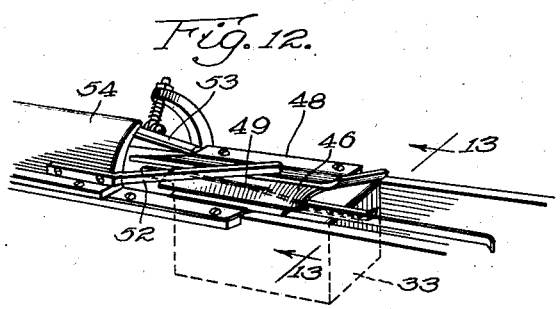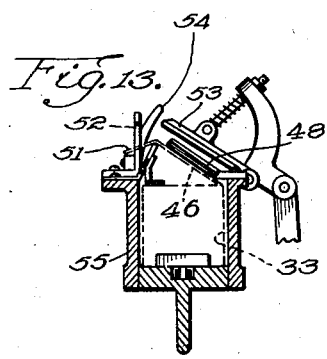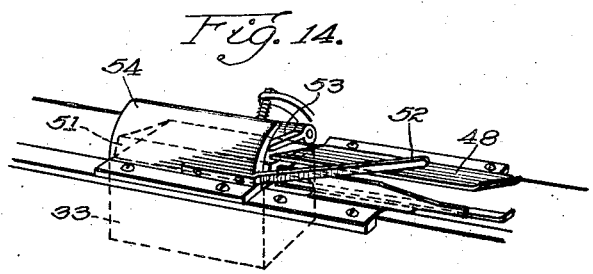

Patented July 10, 1934

1,965,897

UNITED STATES PATENT OFFICE 1,965,897

CARTON CLOSING MACHINE

Emil G. Jurgens and Hazen K. Becker, Chicago, Ill., assignors to Peters Machinery Company, Chicago, Ill., a corporation of Illinois Application April 8, 1932, Serial No. 604,003

3 Claims. (Cl. 93—6)

This invention relates to carton closing machines of the type described in the patents to Peters et al. No. 1,577,850 of March 23, 1926, and No. 860,764 of July 23, 1907.

The objects of the invention are to provide improvements in the arrangement of such machines and the mechanism employed for folding the lining paper and flaps and lid of the carton and tucking the flap end of the carton lid between the lining paper and the side wall of the carton. The purpose of the improvements is to perform such operations more rapidly and efficiently than is possible with prior carton closing mechanisms.

A further purpose of the invention is to provide a machine in which the frame and drive mechanism thereof may be utilized without change for the handling of cartons of different sizes, while the folding unit and other parts such as the closing elements are readily replaceable with structures of different sizes according to the sizes of cartons to be operated upon.

The objects of the invention are accomplished by the construction illustrated by the drawings, in which:

Fig. 5 is a transverse sectional elevation taken on the line 5—5 of Fig. 1.

Fig. 6 is a transverse sectional elevation taken on the line 6—6 of Fig. 1.

Fig. 7 illustrates in perspective the type of carton upon which the machine operates, after the carton is filled for the purpose of folding its lining paper, end flaps, and closing the lid.

Fig. 8 illustrates in perspective the first operation in closing a filled carton; Figs. 9, 10, 11 and 12 illustrate successive closing operations.

Fig. 13 is a sectional view taken on the line 13—13 of Fig. 12.

Fig. 14 shows in perspective the final closing operation when the flap of the lid of the carton is tucked between the carton side and lining paper.

This machine is intended to receive filled cartons from a conveyor which carries them from the filling machine with the top of the lining paper and covering portions of the cardboard carton extending vertically. The closing machine drives the conveyor continuously, and successively shifts the filled cartons from such conveyor to a parallel intermittently driven chain conveyor which serves to shift in position the cartons for successive action thereon by folding, creasing and closing means. The folding means and the closing means are actuated when the chain conveyor is at rest; and when the carton is shifted from one of these devices to the other, guiding and creasing elements position the tucking flap of the carton lid properly for the closing operation.

Figure 2:
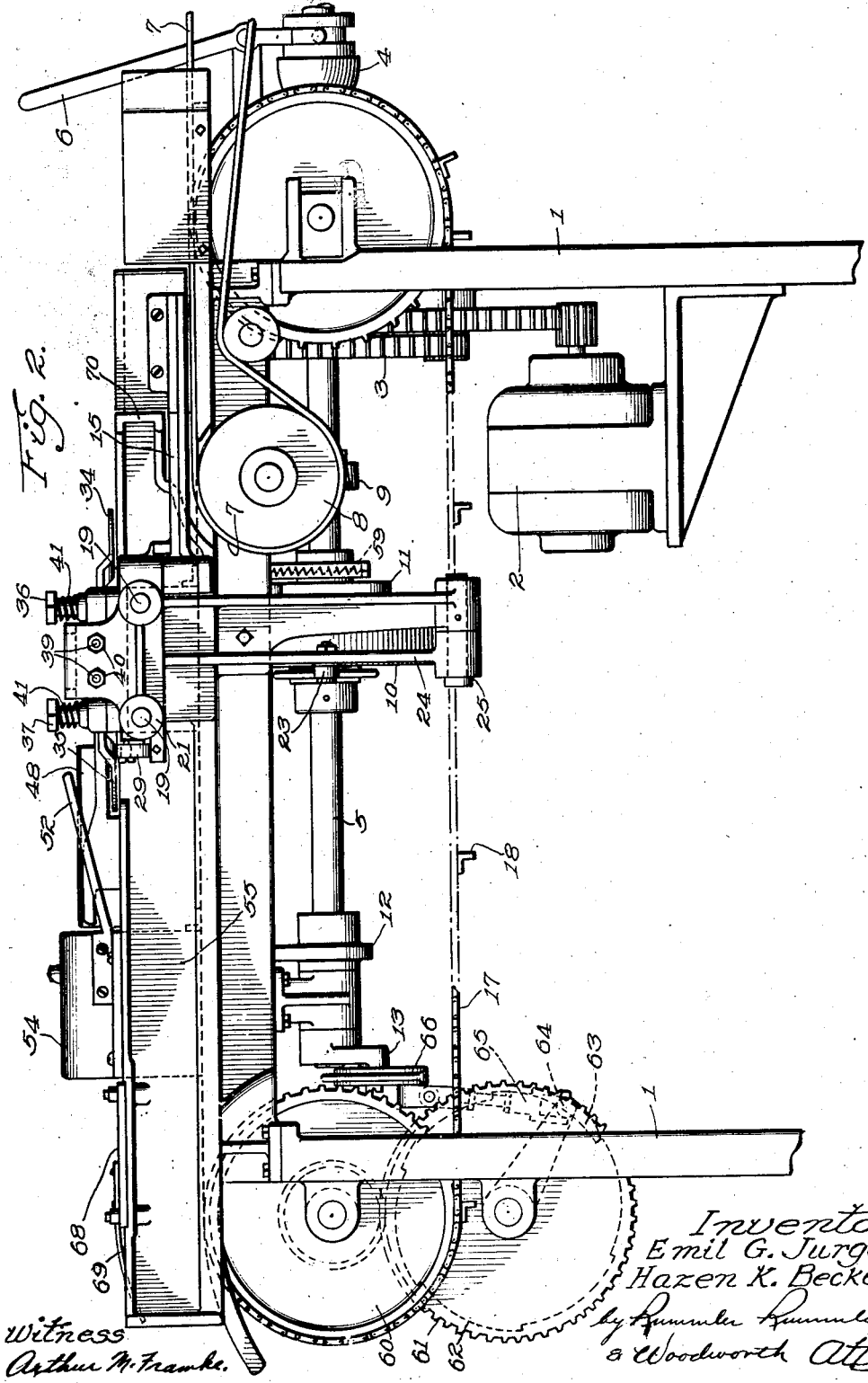
Fig. 2 shows the machine in side elevation.

As shown in Fig. 2, the frame 1 of the machine supports a motor 2 which, through the gearing 3 and clutch 4, may continuously rotate drive shaft 5. The clutch operating lever is indicated at 6. The conveyor belt 7 which carries the filled cartons to the closing machine is driven continuously by a pulley 8 connected through the spiral gearing 9 with drive shaft 5.

The intermittently actuated parts of the machine are driven by cams 10, 11 and 12, and a crank 13 carried by drive shaft 5. The function of cam 10 is to reciprocate a carriage 14. This carriage resiliently supports an arm 15 which, upon each reciprocation of the carriage, pushes one of the filled cartons from the conveyor 7 to a guideway 16 along which the cartons are intermittently shifted by a chain conveyor 17 which has cleats 18 for engagement with the ends of the cartons.

Carriage 14 slides along a pair of horizontal bars 19 extending laterally from frame 1 and further supported at their ends by the frame elements 21 and 22. Carriage 14 is reciprocated along these bars by cam 10 acting upon a pitman 23, Fig. 5, which serves to oscillate arm 24 having a fixed pivot 25 at its lower end and its upper end being connected by link 26 with carriage 14.

A lining paper folding plate 27, Fig. 8, is supported on carriage 14 to reciprocate therewith and may oscillate slightly in an upward direction around the horizontal hinge 28. There is a slight upward motion of this plate effected as it moves toward the carton by the dog 29 carried by the plate engaging fixed cam surface 31, Fig. 3. This dog idly rides over the cam upon the return motion of the plate. The lift of the plate prevents it from engaging the lining paper too closely to the contents of the carton and thus compensates for slight variations of level to which the cartons may be filled.

The reciprocating plate 27 folds the lining paper 30 from the position indicated in Fig. 7 to that indicated by Fig. 8. The remaining side portions 31 of the lining paper and the top end flaps 32 of the cardboard carton 33 are folded inwardly over plate 27 from the ends of the carton by means of the folding arms 34 and 35. These arms are pivoted at 36 and 37, Fig. 1, to carriage 14 and are of bell crank form having inwardly extending arms 38 which are pivotally connected to rods 39 slidable in frame 21.

The rods 39 carry nuts 40 which, upon the inward stroke of the carriage, engage frame element 21 at the proper time to oscillate the arms 34 and 35 for performing the folding operation illustrated by Figs. 9 and 10. The arms 34 and 35 are frictionally held against oscillation by springs 41, Fig. 3, except when forced to rock inwardly by the engagement of the nuts 40 with tie frame 21 upon the end of the forward motion of carriage 14 which carries the pivots for these arms, or are rocked outwardly upon the end of the return stroke of carriage 14 when the shoulders 42 on rods 39 engage the inner surface of frame 21. At the latter time the arms are rocked outwardly ready for another operation.

The nuts 40 are so adjusted on rods 39 to cause one of the arms to operate slightly in advance of the other as illustrated in Fig. 9, in order that the sides of the lining paper may overlap slightly without interference in case the lining paper is of sufficient length for this purpose.

When the carriage 14 moves outwardly the hinged folding plate 27 carried thereby may have a slight dragging action on the lining paper which is folded thereover by the folding arms 34 and 35, and in order to prevent such dragging the frame 21 supports, hinged thereto, a stop element 43, Fig. 5. This stop at its inner end rests upon the folding plate 27 and presents a square shoulder 44 which engages the edge of the folded lining paper and prevents it from being dragged forward upon withdrawal of plate 27. Stop element 43 does not project out far enough to damage upstanding flaps of approaching cartons, it projects sufficiently to hold the lining paper away from the inner side of the carton in order to facilitate the insertion of the cover flap in the space thus provided.

Element 43 is pivoted, so that it is displaced upwardly by pawl 29.

Figure 1:
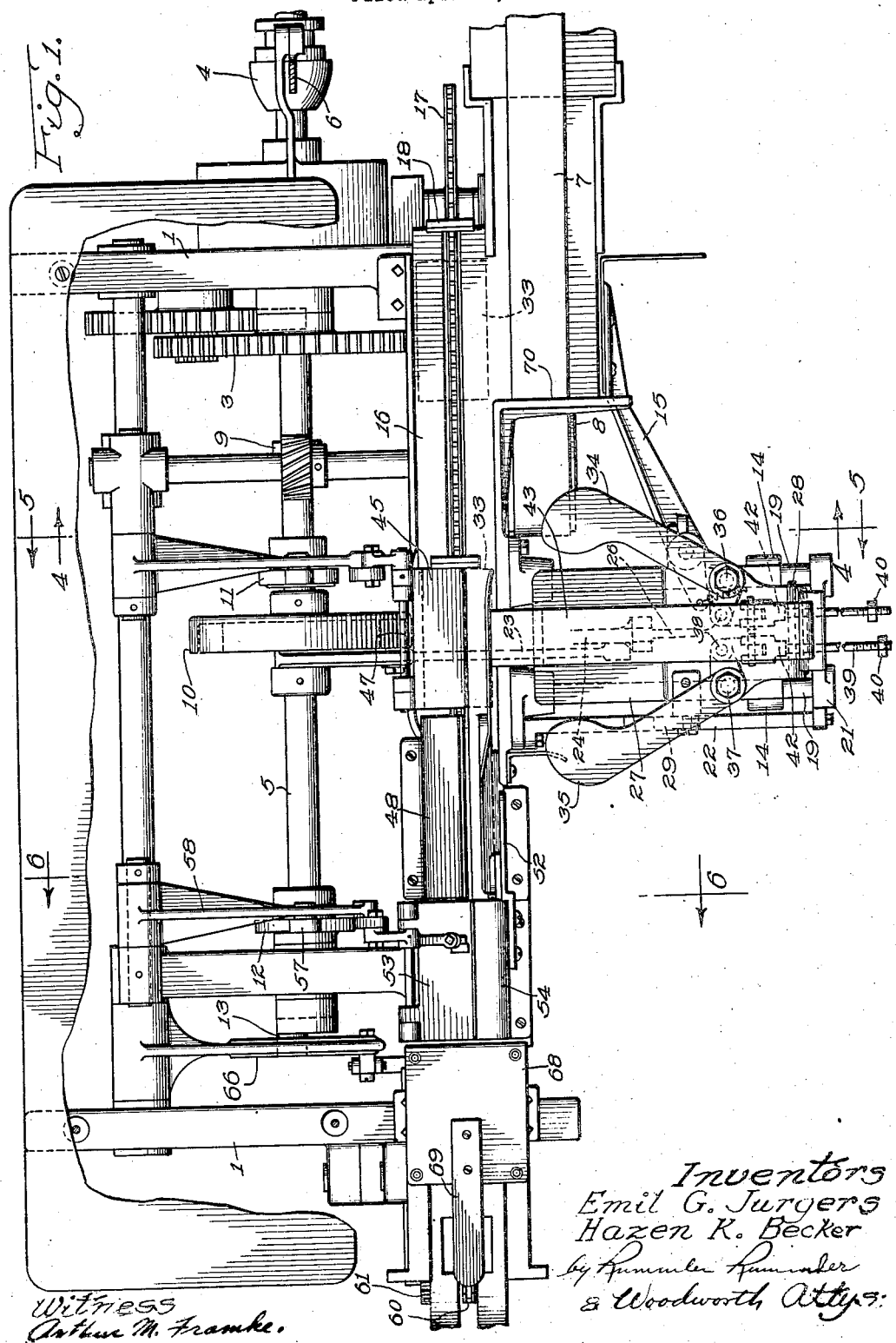
Figure 1 is a plan view of the machine with a table top thereof partly broken away to disclose the drive mechanism beneath the table top.

After the folding operation illustrated by Fig. 10, and before the carton is shifted away from its position opposite carriage 14, a wing 45, Fig. 11, engages the cardboard lid 46 of the carton and bends it forwardly and holds it in such position as the carton is shifted by conveyor 17 toward the left of Fig. 1. This carton lid engaging wing 45 is pivoted on shaft 47 as shown by Fig. 1, and the shaft is rocked by cam 11 and intermediate linkage 48 shown in Fig. 5.

As the carton is shifted toward the left, Fig. 1, from beneath the wing 45 the lid of the carton passes beneath a fixed guide 48, Figs. 1 and 12, in the form of a plate which holds the carton lid substantially in the position to which it was brought by wing 45 as illustrated in Fig. 11. The carton lid also passes over an inclined creasing bar 49 in position to permit the lid of the carton being bent thereover along the score 50, Fig. 10. The downward bending of the tucking flap portion 51 of the carton lid is effected by the inclined fixed cam element 52 due to the travel of the carton from the folding position opposite wing 45, Fig. 1, to the closing position opposite wing 53. After this creasing of the lid of the carton, it passes beneath the fixed curved guide 54 which first serves to hold the carton lid as bent and then to guide it downwardly when engaged by the wing 53. Beneath the guide 54 as illustrated by Fig. 6, the guide wall 55 of the carton passageway is recessed at 56 to permit the adjacent side wall of the carton to bulge outwardly so that the tucking flap of the lid of the carton will pass between the cardboard side of the carton and the lining paper thereof. Wing 53 is operated by cam 12 as illustrated in Fig. 6. Cam 12 acts upon roller 57 carried by arm 58 linked to the wing 53 and which is restored to starting position by spring 59.

Fig. 6 also illustrates ratchet mechanism for intermittently driving the conveyor chain 17. The sprocket 60, around which the chain passes, is driven by gearing 61. The ratchet wheel 62 for driving this gearing is engaged by pawl 63 carried by an arm 64 which has an adjustable link connection 65 with the slotted arm 66 with which crank 13 cooperates.

Figure 3:
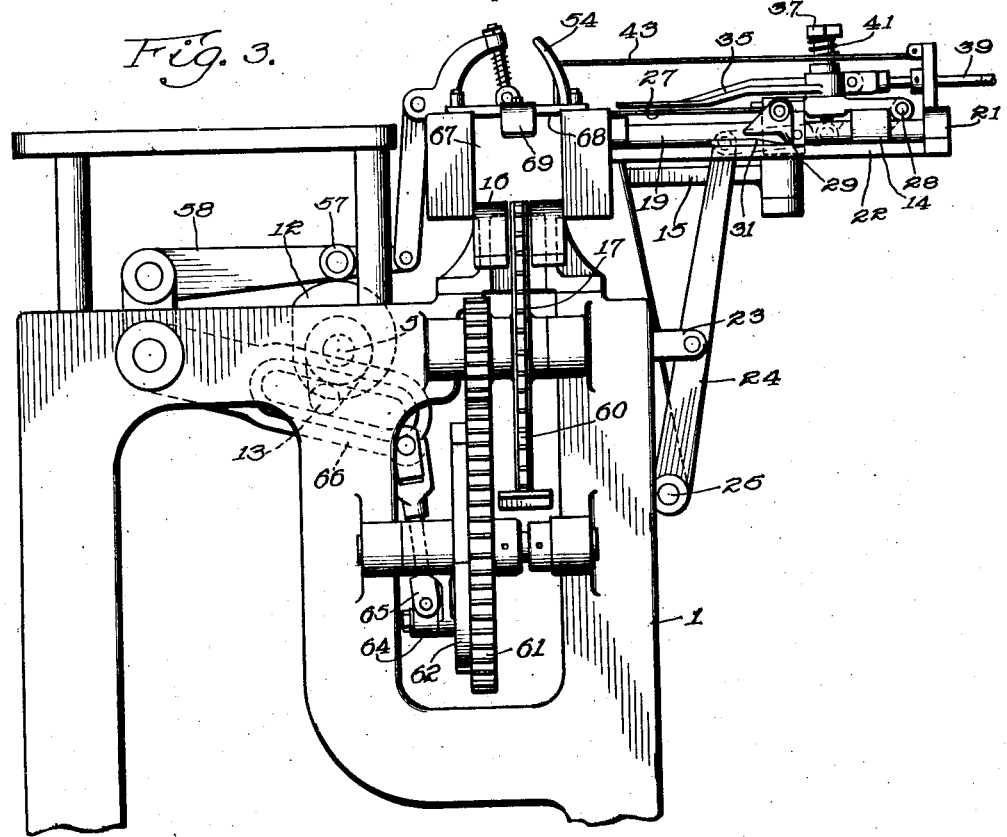
Fig. 3 is an end view of the machine taken from the left of Figs. 1 and 2.
Figure 4:
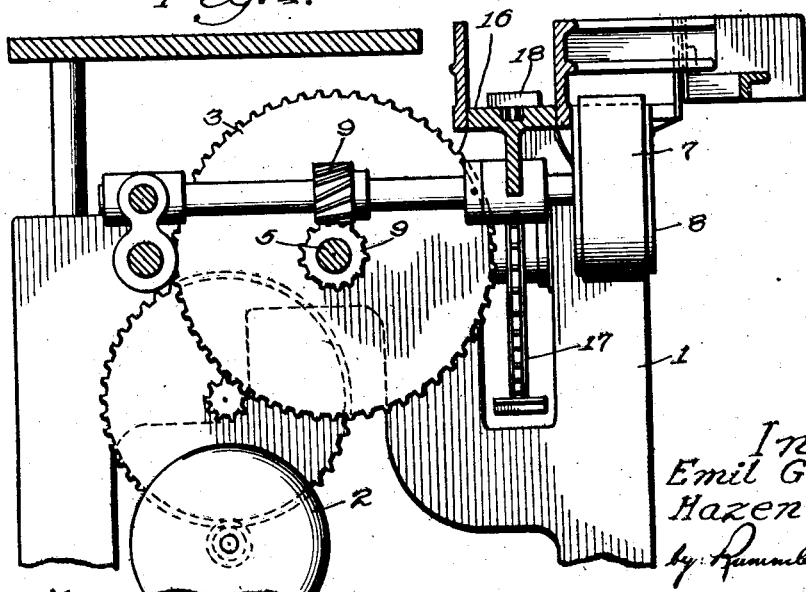
Fig. 4 is a transverse sectional elevation taken on the line 4—4 of Fig. 1.

The closed carton is carried along passageway 67, Fig. 3, beneath the forming plate 68 and spring 69 which serve to deliver the closed package in true rectangular form.

In the operation of this carton closing machine the cartons delivered thereto by belt conveyor 7 are stopped by wall 70, Fig. 1, and one is slid laterally from conveyor 7 to conveyor 17 each time carriage 14 moves inwardly. Since this carriage supports arm 15, the latter moves inwardly and shifts the carton from one conveyor to the other. Conveyor 17 is intermittently operated in timed relation with the carriage 14, and while one carton is shifted to a position opposite wing 45, another will be shifted from that position, which is the folding position, to cooperative relation with the closing wing 53. As the carton passes between such positions the lid thereof is creased by engagement with the inclined creasing elements 49 and 52, Fig. 12.

Between the shifting operations of conveyor 17, carriage 14 is moved forwardly and the wings 45 and 53 are oscillated, the first partly bending the lid of the carton downwardly as illustrated by Fig. 11, and the latter closing the carton by causing the tucking flap 51 of the lid to be inserted between the side wall of the carton and the lining paper thereof as illustrated by Figs. 13 and 14.

The folding of the lining paper takes place while the carton is at rest opposite the carriage 14 and slightly before the forward rocking of wing 45. Upon the forward motion of carriage 14 plate 27 engages the front section of the carton lining paper folding it backwardly over the carton contents as illustrated by Fig. 8. Then the side wings 34 and 35 oscillate inwardly folding the side portions of the lining paper and the end flaps inwardly as illustrated by Figs. 9 and 10.

Although but one specific embodiment of this construction has been herein shown and described, it is to be understood that details of the construction shown may be altered or omitted without departing from the spirit of the invention as defined by the following claims.

We claim:

1. A carton closing machine having a continuously operated drive shaft, a conveyor for transporting cartons through the machine, said drive shaft having connections for intermittently operating said conveyor, lining paper and flap folding means having connections for reciprocation by said drive shaft and comprising a sliding plate for folding the lining paper, and a pair of end folding elements mounted for oscillation upon said carriage in a horizontal plane, means causing said plate to lift as the plate is moved forwardly, and means for causing said end folding elements to move inwardly over said plate as the plate is moved forwardly.

2. A carton closing machine comprising two parallel conveyors, means for operating one conveyor continuously and the other intermittently by the same power source, a reciprocating carriage moving in a direction angular to and across the path of said conveyors, means attached to said reciprocating carriage for regularly shifting cartons from the continuously moving conveyor to the intermittently moving conveyor, and means attached to said reciprocating carriage for successively closing the end coverings of the carton.

3. In a carton closing machine a reciprocating carriage comprising a sliding plate for folding lining paper, a pair of end folding elements mounted for oscillation upon said carriage in a horizontal plane, adjustable means for causing first one of said end folding elements and then the other of said end folding elements to move inwardly over said plate as the plate is moved forwardly, and a stop element for engaging folded lining paper upon withdrawal of said sliding plate.

EMIL G. JURGENS.
HAZEN K. BECKER.